Sept. 29, 1959     C. J. SAUBER     2,906,014
METHOD OF RENEWING THE FEMALE MEMBER OF A SNAP FASTENER
Filed April 11, 1955
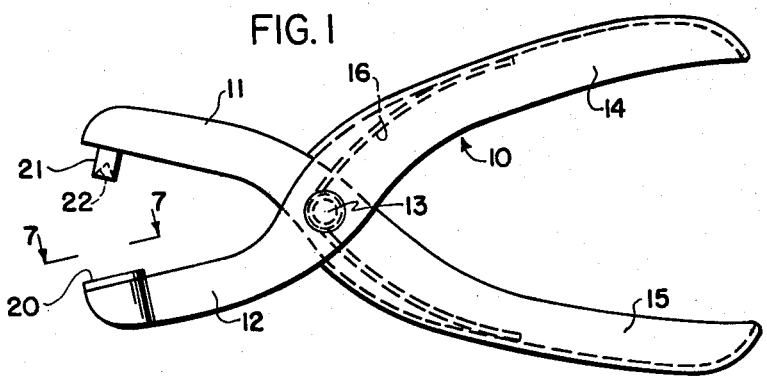
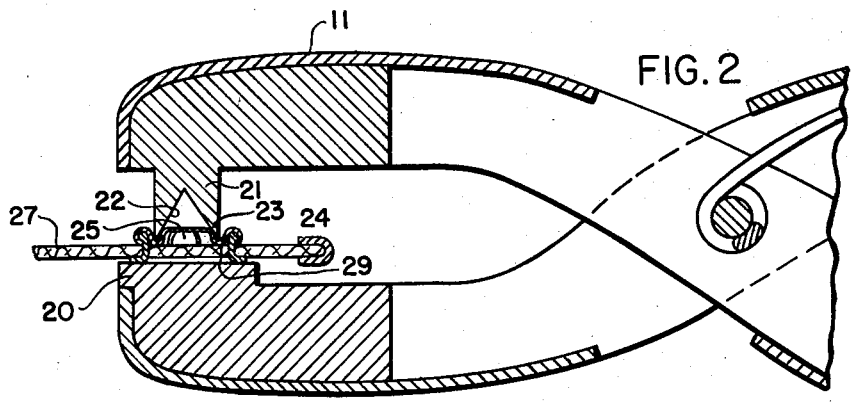
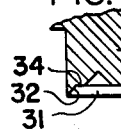
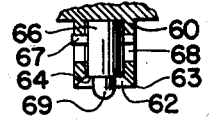
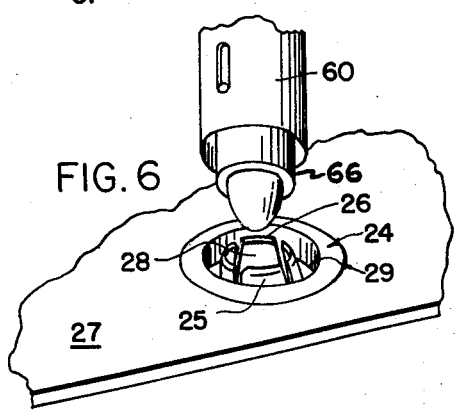
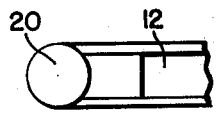
INVENTOR.
CHARLES J. SAUBER
BY
ATTORNEY

United States Patent Office 2,906,014
Patented Sept. 29, 1959

2,906,014

METHOD OF RENEWING THE FEMALE MEMBER OF A SNAP FASTENER

Charles J. Sauber, Virgil, Ill.

Application April 11, 1955, Serial No. 500,369

1 Claim. (Cl. 29—401)

This invention relates in general to a method for renewing the gripping properties of a female snap fastener element and apparatus for carrying out the method.

Numerous items of wearing apparel and other items made of pliable material requiring a closure which is subject to heavy duty stresses and strains, employ snap fasteners of the so-called "gripper" or "bull dog" types. The female element of such a fastener is generally made up of two pieces: the gripping member to receive and grip the male fastener member, and a clamp for securing the gripping member to the pliable material. The female fastener element is formed generally with an outer collar and an intermediate annulus between the outer collar and a central upstanding extruded resilient and slotted gripping member.

After the snap fastener has been used a considerable number of times the central aperture defined by the slotted gripping member becomes enlarged so that it no longer is capable of securely holding the male fastener element. Other forces, such as those applied by the agitators or wringers of mechanical washing machines, may also cause the gripping element to become somewhat deformed so that it loses its gripping properties. Heretofore, such a damaged or deteriorated fastener had to be either replaced, in many cases with great difficulty in order not to tear or damage the material or cloth to which it was secured, or the entire garment or item had to be discarded.

Applicant has overcome these difficulties by his novel method of renewing the gripping properties of the deformed female fastener element in which method one or more controlled forces are applied thereto. Applicant has also provided a number of apparati by which the novel method may be simply and expeditiously carried out.

Applicant's method for renewing the gripping properties of the female snap fastener element includes the step of applying inwardly directed forces peripherally against the outer wall of the gripping portion of the female element. The effect of these forces is controlled and limited to constrict the gripping member of the female fastener element to a predetermined degree. Additional forces may be thereafter or simultaneously applied longitudinally of the wall of the gripping portion of the female fastener element and against the free peripheral edge thereof to crimp it inward and over.

These forces may be applied conveniently by means of a hand tool having a fixture and a platen adapted and arranged to suitably engage the work piece, and which may be caused to be moved relatively to one another by hand pressure exerted upon the tool.

It is accordingly the principal object of this invention to provide a method for renewing the gripping properties of the female element of a snap fastener by applying inwardly directed forces peripherally against the outer wall of the gripping member thereof while controlling and limiting the effect of the forces so applied to constrict the gripping member to a predetermined degree.

A further object of this invention is to include in the foregoing method the application of additional forces longitudinally of the gripping portion of the female fastener element to crimp it over and inward.

These objects and additional features and advantages will become more readily apparent as the following description of various forms of apparatus for carrying out the method proceeds, taken in conjunction with the accompanying drawing in which:

Figure 1 is an elevational view of a conventional pincers type of instrument within the jaws of which are incorporated in its simplest form a fixture for carrying out the objects of this invention.

Figure 2 is an enlarged partial sectional view of the device illustrated in Figure 1, with the jaws closed and the fixture engaging a typical snap fastener element secured to a section of cloth material.

Figure 3 is a sectional view of another modification of fixture for carrying out applicant's invention.

Figure 4 is a sectional view of another modification of fixture for carrying out applicant's invention.

Figure 5 is a sectional view of still another modification of fixture for carrying out applicant's invention.

Figure 6 is a perspective view of the modification of fixture illustrated in Figure 5 in relation to its application to a typical fastener element secured to a piece of pliable material.

Figure 7 is a view taken on line 7—7 of Figure 1.

Referring now more particularly to the drawings illustrating several apparati for carrying out applicant's novel method, the reference numeral 10 designates generally a common pincer tool for applying pressure between its upper jaw 11 and lower jaw 12 respectively. The jaws 11 and 12 are movable relative to one another about a pivot 13 when pressures are applied to the longer handle elements 14 and 15 as for example, by gripping between the palm and fingers of the hand. The conventional pincer element 10 illustrated is provided preferably with a spring member 16, biasing the handles 14 and 15, and the jaws 11 and 12, toward a normally open position.

One jaw, 12 for example, is provided on its inner face with an anvil or platen 20. Secured by any suitable means to the inner surface of the other jaw, 11 in this instance, and over the anvil or platen 20 is a cylindrical fixture 21, the free end of which is provided with an inwardly tapered or conical recess 22.

As will be apparent from the enlarged sectional view in Figure 2, when the jaws are caused to be moved toward one another so that the conical recess of the fixture 21 peripherally engages the slotted wall 25 of the gripping portion of the female snap fastener element 24 attached to cloth or other pliable material 27 and positioned on the anvil or platen 20, inwardly directed forces will be exerted by the conical recess 22 against the peripheral wall 25 of the female fastener element 24, whereby the aperture 28 defined by the wall 25 is constricted to a degree predetermined by the angle of the walls of the conical recess 22. It will be noted further that the extent of relative movement between the platen 20 and the fixture 21, and therefore the pressure applied, is controlled and limited by the peripheral edge 23 of the base of the conical recess 22 as it engages the base of the annulus 29 between the wall 25 and the outer collar.

In Figure 3 there is illustrated a modification of the fixture appearing in Figures 1 and 2, which differs therefrom only in that it is provided with a tapered and stepped recess. The base or pressure exerting portion of this fixture 30 is provided with a frustro conical recess 31, the tapered walls 32 of which act in the same manner as the tapered walls of fixture 21 to constrict the slotted gripping walls 25 of the female fastener element. Likewise, as was the case with the fixture 21, the lower annular edge 33 limits with the angle of the taper 32 the degree of constriction of the walls 25 to a preselected amount. The stepped ledge or seat 34 of the frustro conical recess 31 brings forces to bear longitudinally of the walls 25 and against the upper edge thereof tending to crimp the upper edge 26 over and inward. This second crimping force tends to maintain the gripper portion 25 in its constricted form for a greater length of time.

In Figure 4 there is shown another embodiment of fixture which in most respects is substantially the same as that shown in Figure 3, except that it is transversely slotted at 45 and 46. This renders the fixture, 40, somewhat more resilient than the fixture illustrated in Figure 3. In other respects the forces applied by the tapered wall 42 of the frustro conical recess 41 and those applied by the seat 44 for crimping the upper edge of the wall of the gripping element over and inward are substantially the same. Here again, the annular edge cooperating with the angle of the taper 42, limits the degree to which the pressures applied may constrict the walls 25 of the female fastener element 24.

In Figures 5 and 6 there is shown still another modification of fixture for carrying out applicant's novel method. In this embodiment 60 represents a tubular or cylindrically hollow barrel, the lower or open end of which is tapered at 62. Within the hollow cylinder 60 there is slidably arranged a cylindrical member 66, the extent of slidable movement of which is limited by a pin 67 affixed to the cylinder 66 and riding in slots 68 provided in the opposite walls of the cylindrical sleeve 60. The cylindrical member 66 is proportioned so that when it is in its retracted position, that is fully within the opening of the member 60, its lower surface 64 forms with the tapered end 62 of the sleeve 60, a frustro conical recess to engage the slotted walls 25 of the female gripping element to exert thereagainst the inwardly directed forces and the longitudinally directed crimping forces. As was the case with the previously described fixtures, the lower annular edge 63 in cooperation with the angle of the taper 62 limits the degree to which the pressures applied may constrict the walls 25 of the female fastener element 24. In this embodiment the cylindrical member 66 is provided at its free end with a central rounded projection 69 of lesser diameter than the diameter of the cylindrical member 66 itself, the purpose for which is to act as a guide or positioning means to seek out the aperture 28 defined by the walls 25 of the gripping element 24.

It will be appreciated that any of the types of fixtures described may be secured releasably to the jaw 11 and may further be provided in a variety of sizes for interchange to meet particular size requirements of various snap fasteners encountered commercially.

It will be understood that the embodiments of apparatus disclosed herein are merely illustrative of forms of apparatus which may be utilized to carry out applicant's novel renewing method and it is therefore intended that all such modifications as are hereby suggested and which are within the spirit of this invention, shall be included within its scope as best defined by the appended claim.

I claim:

The method of restoring to original condition the gripping properties of disarranged female elements of snap fasteners of the type wherein a plurality of prongs extend upwardly in the form of a discontinuous inner wall of a limited annular space extending therearound and which prongs are normally arranged in uniformly spaced relationship about a central longitudinal axis and in which the upper extremities of said prongs are inwardly turned toward said axis, the restoration being such that the said prongs will again snugly receive and yieldingly restrain within their confines a generally bulbous male fastener element without loss of resiliency over a protracted period of time, the steps of which comprise simultaneously applying within said limited annular space and against each of the prongs intermediate their bases and upper extremities forces directed inwardly toward said axis about which said prongs are disposed, limiting the effect of the forces thus applied to simultaneously constrict the said prongs to a preselected degree only, and applying to the upper extremities of said prongs additional forces parallel to said axis about which the prongs are disposed to simultaneously crimp the upper extreme ends of said prongs downwardly and inwardly toward said axis.

References Cited in the file of this patent

UNITED STATES PATENTS

| | | |
|---|---|---|
| 321,822 | Kind | July 7, 1885 |
| 1,045,299 | Krimmling | Nov. 26, 1912 |
| 1,048,776 | Williams | Dec. 31, 1912 |
| 1,216,717 | Miller | Feb. 20, 1917 |
| 1,433,890 | Johnson et al. | Oct. 31, 1922 |
| 1,479,039 | Greene | Jan. 1, 1924 |
| 1,801,460 | Smith | Apr. 21, 1931 |
| 2,089,518 | Williams | Aug. 10, 1937 |
| 2,212,361 | Arthur | Aug. 20, 1940 |
| 2,256,130 | Traschsel | Sept. 16, 1941 |
| 2,644,355 | Greco | July 7, 1953 |
| 2,810,312 | Mueller | Oct. 22, 1957 |